(12) United States Patent
Lambiaso

(10) Patent No.: US 6,644,593 B2
(45) Date of Patent: Nov. 11, 2003

(54) AIRCRAFT SEAT MOUNTED PASSENGER INTERFACE

(75) Inventor: Guy A. Lambiaso, Garden Grove, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/941,497

(22) Filed: Aug. 29, 2001

(65) Prior Publication Data

US 2003/0042360 A1 Mar. 6, 2003

(51) Int. Cl.⁷ .............................................. B64D 11/06
(52) U.S. Cl. ................................. 244/118.5; 244/118.6
(58) Field of Search ........................... 244/118.5, 118.6, 244/137.2; 105/345; 297/217.3

(56) References Cited

U.S. PATENT DOCUMENTS

| | | | |
|---|---|---|---|
| 4,509,097 A | 4/1985 | Robinson | |
| 6,016,016 A | 1/2000 | Starke et al. | |
| 6,102,476 A | * 8/2000 | May et al. | 297/217.3 |
| 6,145,926 A | * 11/2000 | Lin | 297/170 |
| 6,249,913 B1 | * 6/2001 | Galipeau et al. | 700/295 |

FOREIGN PATENT DOCUMENTS

| | | | | |
|---|---|---|---|---|
| DE | 34 16 486 A | | 11/1984 | |
| SE | 0 926 065 A | | 6/1999 | |
| WO | WO-0022488 | * | 4/2000 | G05B/15/02 |

OTHER PUBLICATIONS http://www.circlebmw.com/service/access/phone/84110009077.*
http://www.alldata.com/TSB/06/99068139.*
http://www.lauderdalebmw.com/ps/celphone.html.*
EMPORT Brochure, http://www.gd-ais.com/Products/srs/aircraftcabin/emportbrochure.pdf.*
E-mail for all on Virgin Atlantic, http://news.com.com/2102-1023-254720.html.*
Virgin Atlantic Selects Primex' EmPort Airborne Network, http://www.shareholder.com/gendyn/news/20000920-23798.cfm.*
Aeronautics Days 2001, http://europa.eu.int/comm/research/growth/aeronautics-days/.*
Cathay Pacific Airways Expands Commitment to Primex'EmPort, http://www.shareholder.com/gendyn/news/20000920-23894.cfm.*
Kelly, E, "In-Flight E-Mail Race Intensifies", Oct. 3, 2000, p. 40.

* cited by examiner

Primary Examiner—Charles T. Jordan
Assistant Examiner—Timothy D Collins
(74) Attorney, Agent, or Firm—Harness Dickey & Pierce P.L.C.

(57) ABSTRACT

An aircraft seat mounted passenger interface apparatus is provided including a seat having an arm portion and a frame. The frame is mounted to a floor of the aircraft. A cavity is formed in the arm portion and an internet interface device is disposed within the cavity. The internet interface device is operable in a first mode enabling access to an internet connection port and in a second mode preventing access to the internet connection port. Preferably, the internet interface device includes an access panel residing substantially flush with a surface of the arm portion in the second mode. Also, the cable interconnecting the internet interface device with an internet server is preferably routed along the frame of the seat.

6 Claims, 2 Drawing Sheets

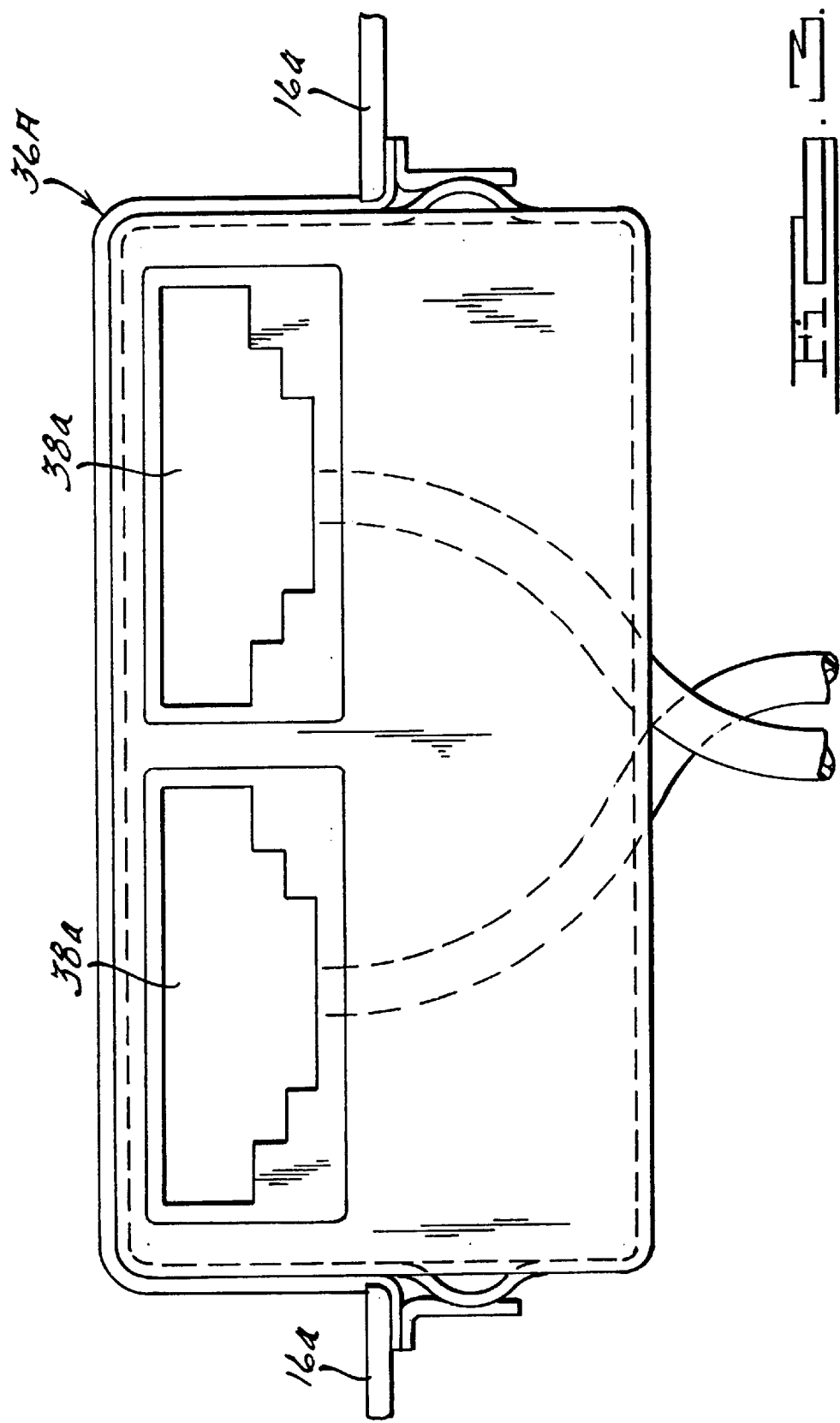

AIRCRAFT SEAT MOUNTED PASSENGER INTERFACE

FIELD OF THE INVENTION

The present invention relates to aircraft based electronic systems and, more particularly, to an aircraft seat mounted passenger interface device.

BACKGROUND OF THE INVENTION

Many aircraft travelers use personnel computers during the flight. Some of these travelers need internet access while in-route. Unfortunately, most commercial aircraft are not equipped with appropriate internet interface equipment.

To provide a traveler with internet access on an aircraft, an internet interface device is needed. However, the electronic equipment configuration in the passenger seats is certified as part of a sophisticated seat certification process. The vast majority of modifications and additions to seat-based electronic equipment requires re-certification of the seats. This process can be costly and time consuming. Further, the removal and re-installation of aircraft seats to effect the modification and/or addition is also time-consuming. As such, airline customers are sometimes reluctant to accept any seat modifications.

Notwithstanding the foregoing, certain modifications to aircraft seat-base electronics be accomplished with minor re-certification and may not require removal of the seats. If the modification minimally changes the seat load, then re-certification can be quickly accomplished. For example, an on-board checklist type inspection may be all that is required.

Accordingly, it would be desirable to utilize the ashtray receptacle commonly located within an aircraft seat arm as an internet interface receptacle location. Since smoking on most commercial aircraft flights has been banned, this change will not effect travel. Further, since the seat arm is readily accessible, removal of the seat is not required to effectuate the modification. Finally, since the internet interface device adds little or no weight to the passenger seat, re-certification of the seat may not be needed.

SUMMARY OF THE INVENTION

The above and other objects of the present invention are provided by an aircraft seat mounted passenger interface device. More particularly, the seating arrangement includes a seat having an arm portion and a frame. The frame is mounted to a floor of the aircraft. A cavity is formed in the arm portion and an internet interface device is disposed within the cavity. The internet interface device is operable in a first mode enabling access to an internet connection port and in a second mode preventing access to the internet connection port. Preferably, the internet interface device includes an access panel residing substantially flush with a surface of the arm portion in the second mode. Also, the cable interconnecting the internet interface device with an internet server is preferably routed along the frame of the seat.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 is a rear elevational view of an alternate embodiment of the interface device of FIG. 2.

DETAILED DESCRIPTION OF THE PREFERRED EMBODIMENTS

The following description of the preferred embodiments is merely exemplary in nature and is in no way intended to limit the invention, its application, or uses.

The present invention is directed towards an airline passenger interface device which is mounted within a cavity in a passenger seat. The cavity is preferably pre-formed in the arm portion of the seat in the form of an ashtray compartment. The internet interface device is pivotably disposed within the cavity such that it is operable in a first mode enabling access to an internet connection port and in a second mode preventing access to the internet connection port. Advantageously, since the seat arm is readily accessible, removal of the seat is not required to effectuate the modification. Also, since the internet interface device adds little or no weight to the passenger seat, a simplified re-certification process for the seat may be all that is needed.

Figure 1:
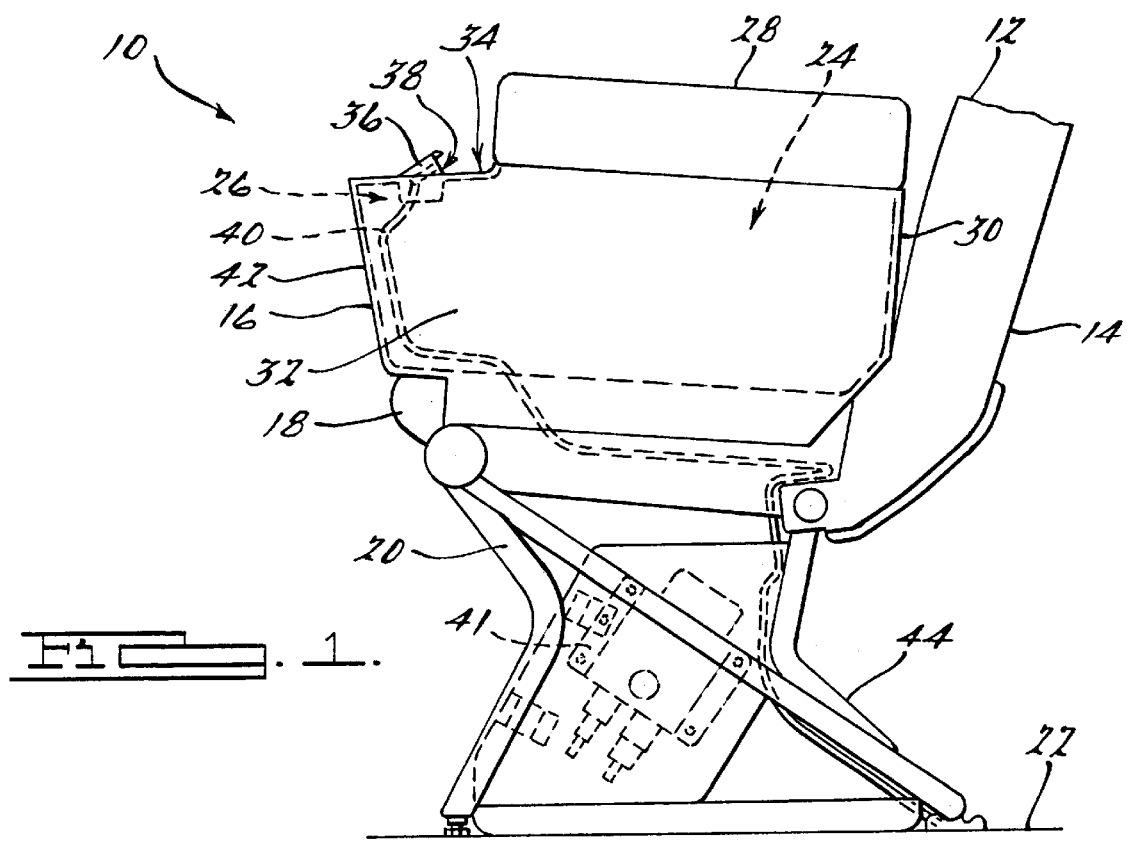
FIG. 1 is a cross-sectional side view of an aircraft seating arrangement incorporating the teachings of the present invention.

Turning now to the drawing figures, FIG. 1 illustrates an aircraft seat arrangement generally at 10. Although in a commercial embodiment of the present invention numerous seating units would make up the seat arrangement 10, the seat arrangement 10 illustrated in FIG. 1 includes only one seat unit 12. The seat unit 12 includes a seat back 14, a seat arm 16, and a seat bottom 18. The seat unit 12 also includes a rigid frame 20 supporting the remaining seat components. The frame 20 is connected at an upper end to the seat bottom 18 and at a lower end to a floor 22. Although the floor 22 is preferably one found in an aircraft, one skilled in the art will recognize that another environment, such as a bus or train, could substitute therefore.

The seat arm 16 of the seat unit 12 includes a generally rectangularly shaped major cavity 24 adjacent to a much smaller generally rectangularly shaped minor cavity 26. The major cavity 24 is accessed from an open top by rotating a generally planar arm rest 28 to a first or open mode from a second or closed mode. In the second mode, the arm rest 28 is generally horizontally oriented such that it encloses the major cavity 24 with the remaining elements of the seat arm substructure 30 (i.e., the perimeter wall and substrate). In the first mode, the arm rest 28 is rotated away from the substructure 30 so as to reside essentially vertically to thereby provide access to within the major cavity 24 through the open top. Items such as a seat tray 32 are commonly removably and/or pivotably stored within the major cavity 24.

The minor cavity 26 is preferably located adjacent a proximal end of the seat arm 16 relative to the seat back 14. The minor cavity 26 is preferably accessed from a top portion 34 of the seat arm 16 forward of the arm rest 28. Also, the minor cavity 26 is preferably original equipment within a current production seat unit 12. That is, the minor cavity 26 may be pre-formed in the seat arm 16 for use in accommodating an ash tray.

In this instance, the seat unit 12 may be retrofit by removing and/or modifying the ash tray normally occupying the minor cavity 26 and replacing and/or attaching the internet interface device of the present invention therein. Thus, the seat unit 12 can be said to operate in a first mode accommodating an ash tray in the minor cavity 26, and in a second mode accommodating an internet interface device in the minor cavity 26 (either instead of, or in combination with the original ash tray housing).

Still referring to FIG. 1, an internet interface device 36 is pivotably disposed within the minor cavity 26. The interface device 36 includes an internet connection port in the form of a connector 38 formed therein for connecting to a personal computer (not shown). Although other connectors may be used, it is presently preferred to employ an RJ45 type connector. The interface device 36 is operable in a first or open mode providing access to the connector 38 and in a second or closed mode preventing access the internet connector 38. In the closed mode, the top panel (described in greater detail below) of the interface device 36 is preferably substantially flush with the top portion 34 of the seat arm 16.

A flexible cable 40 coupled to the internet connector 38 extends from the interface device 36 to an internet server (not shown) located in a remote location relative to the seat unit 12. Alternatively, the cable 40 may be coupled to a seat box 41 mounted to seat frame 20. The seat box 41 performs many of the functions normally associated with a server.

The cable 40 preferably extends along the seat frame 20 and through the floor 22. More particularly, the cable 40 extends along an interior portion of the front wall 42 of the seat arm 16, between the seat frame 20 and seat bottom 18, and then along the rear portion 44 of the seat frame 20. Even more particularly, the cable 40 is tie wrapped to an existing seat cable (not shown) past the chord reel interface (also not shown). In this way, the cable 40 does not interfere with passengers neat the seat unit 12.

Figure 2:
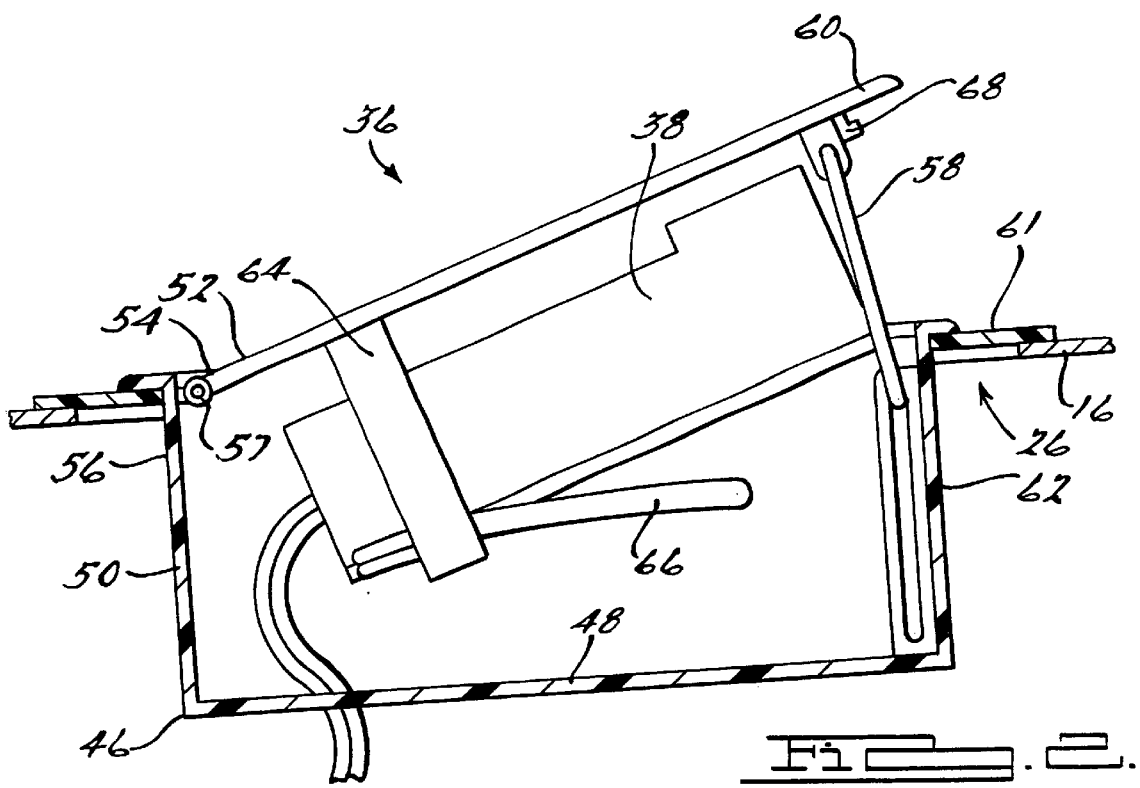
FIG. 2 is a side elevational view of an interface device incorporated into a portion of the aircraft seating arrangement of FIG. 1.

Referring now to FIG. 2, a more detailed view of the interface device 36 is illustrated. The interface device 36 includes a metal or plastic generally rectangular housing 46 having a preferably planar base 48 coupled to a relatively upstanding perimeter wall 50 extending therefrom. A plastic or metal pivotable panel 52 is pivotally coupled at a rear end 54 to a rear section 56 of the wall 50 by a hinge 57. A slideable guide member 58 in the form of a bar pivotally coupled to the panel 52 at one end and slideably retained in a slotted bracket at an opposite end interconnects the front end 60 of the panel 52 to a front section 62 of the wall 50.

The housing 46 is nested within the minor cavity 26 in the seat arm 16. A bezel or plate 61 is interposed between the housing 46 and seat arm 16. The plate 61 is only necessary if the size of the opening to cavity 26 is greater than the size of the housing 46 by more than an amount that can be accommodated, i.e., overlaid, by lip 63 of wall 50. Since plate 61 can always include a standard sized aperture formed therein for accommodating the device 36, plate 61 enables a standardized device 36 to be incorporated into various sized cavities 26.

The connector 38 is mounted to the panel 52 by at least one bracket 64. Alternatively, the connector 38 may be glued, bolted, riveted, or otherwise fixedly or removably secured to the panel 52. Of course, the connector 38 may also be secured to another portion of the housing 46 if desired.

A biasing member in the form of a spring tab 66 coupled to the lower surface of the connector 38 urges the panel 52 towards an open position. A selectively lockable tab 68 in the form of a spring steel clip normally retains the panel 32 in a closed position against the bias of the spring tab 66. When the lockable tab 68 is released by a user, the panel 52 rises out of the housing 46 to expose the connector 38. While a tab 68 has been described, one skilled in the art will appreciate that a number of other lock/unlock mechanisms could substitute therefore.

Turning now to FIG. 3, an alternate embodiment internet connection device 36a is illustrated in seat arm 16a. As illustrated, the connection device 36a is rotated upwardly relative to seat arm 16a to expose connector 38a. In this embodiment a double connector 38a is provided to enable multiple users to access the internet through a single internet connection device 36a.

Thus, an internet interface device is provided within an aircraft seat. Advantageously, the device may be retrofit into existing seats without requiring removal of the seats. Moreover, the modification of the seats so insignificantly effects seat load that the seat may not need re-qualification for forward crash loads.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A seating unit comprising:
   a passenger seat;
   an arm rest coupled to said passenger seat, said arm rest including a cavity formed therein;
   a network interface device including a housing disposed within said cavity, said housing including a base and a wall upstanding from said base;
   a pivotable panel connected to said wall opposite said base; and
   at least one connector of said interface device fixedly mounted directly to said panel;
   wherein said panel is operable in a first mode exposing said connector relative to said housing and in a second mode enclosing said connector within said housing, said panel residing substantially flush with an upper surface of said arm rest in said second mode.

2. The seating unit of claim 1 further comprising a biasing member urging said panel into said first mode.

3. The seating unit of claim 1 further comprising a cable interconnecting said interface device with a server, said cable being routed along a frame of said seat.

4. A seating arrangement for an aircraft comprising;
   an aircraft;
   a seat including an arm portion and a frame, said frame being mounted to a floor of said aircraft;
   a cavity formed in said arm portion; and
   a network interface device including a housing disposed within said cavity; and
   a network connection port fixedly mounted directly to an access panel pivotally connected to said housing, said panel being operable in a first mode permitting access to said art and in a second mode preventing access to said port, said access panel residing substantially flush with an upper surface of said arm portion in said second mode.

5. The seating arrangement of claim 4 further comprising a cable interconnecting said interface device with a server, said cable being routed along said frame of said seat.

6. The seating arrangement of claim 4 wherein said cavity further comprises an ashtray receptacle.

* * * * *